(12) United States Patent
Wada

(10) Patent No.: US 7,979,485 B2
(45) Date of Patent: Jul. 12, 2011

(54) CIRCUIT FOR FAST FOURIER TRANSFORM OPERATION

(75) Inventor: Yoshio Wada, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1233 days.

(21) Appl. No.: 11/641,864

(22) Filed: Dec. 20, 2006

(65) Prior Publication Data

US 2007/0162533 A1   Jul. 12, 2007

(30) Foreign Application Priority Data

Dec. 20, 2005 (JP) .................. 2005-366731
Oct. 18, 2006 (KR) .................. 10-2006-0101573

(51) Int. Cl.
*G06F 17/14* (2006.01)
(52) U.S. Cl. ........................................ 708/404
(58) Field of Classification Search ................. None
See application file for complete search history.

(56) References Cited

U.S. PATENT DOCUMENTS

| 7,428,564 B2 * | 9/2008 | Gibb et al. .................... 708/409 |
| 7,693,034 B2 * | 4/2010 | Singh et al. ................... 370/208 |
| 2002/0178195 A1 * | 11/2002 | Ryu .............................. 708/404 |
| 2004/0039765 A1 | 2/2004 | Nakazuru et al. |
| 2005/0114421 A1 * | 5/2005 | Gibb et al. .................... 708/404 |
| 2008/0071848 A1 * | 3/2008 | Baireddy et al. .............. 708/404 |

FOREIGN PATENT DOCUMENTS

| JP | 6-19955 A | 1/1994 |
| JP | 2002-132747 A | 5/2002 |

OTHER PUBLICATIONS

Japanese Office Action issued on Mar. 1, 2011 in the corresponding Japanese Patent Application No. 2005-366731.

* cited by examiner

*Primary Examiner* — David H Malzahn
(74) *Attorney, Agent, or Firm* — Sughrue Mion, PLLC

(57) ABSTRACT

A circuit for a fast Fourier transform (FFT) operation is provided. The FFT operation circuit includes a plurality of butterfly operation units connected in series. Each of the plurality of butterfly operation units reads a signal in the order in which the plurality of butterfly operation units perform complex multiplication, addition, and subtraction, performs complex multiplication of each sequentially read signal by a complex coefficient corresponding to an FFT length and the stage number of the butterfly operation unit, and performs complex addition and subtraction with the complex multiplied signal. In this way, without disposing a plurality of operation circuits corresponding to a radix, FFT operations corresponding to a plurality of FFT lengths can be performed.

10 Claims, 3 Drawing Sheets

CIRCUIT FOR FAST FOURIER TRANSFORM OPERATION

CROSS-REFERENCE TO RELATED PATENT APPLICATIONS

This Application claims priority from Japanese Patent Application No. 2005-366731, filed on Dec. 20, 2005, in the Japanese Intellectual Property Office, and from Korean Patent Application No. 10-2006-0101573, filed on Oct. 18, 2006, in the Korean Intellectual Property Office, the disclosures of which are incorporated in their entirety by reference.

BACKGROUND OF THE INVENTION

1. Field of the Invention

Apparatuses consistent with the present invention relate to a fast Fourier transform (FFT) operation circuit used in digital signal processing of data communication, video and voice signals.

2. Description of the Related Art

A fast Fourier transform (FFT) is used for extracting a frequency component hidden as data in a series of signals in the time domain, and is capable of processing a plurality of data signals in a short time. The FFT also has an advantage in that it requires only a small circuitry area when it is implemented as hardware.

In wireless communication standards, such as those used for mobile phones, a variety of cellular methods or wireless local area network (WLAN) methods are used. Ordinary users utilize the advantages of these standards, thereby trying to perform efficient wireless communication. For example, in the field of data communication, the length of FFT data (FFT length) varies with respect to the purpose of its use. Examples include Institute of Electrical and Electronics Engineers (IEEE) 802.11a which is a WLAN standard, in which the data length is 64, and one of 4 Generation (4G) mobile standards in which the data length is 1023. Accordingly, a multi-mode terminal which implements a plurality of standards in one hardware apparatus has a plurality of embedded chip sets, thereby increasing the size of the apparatus. As a result, the necessity of an FFT operation circuit for a plurality of chipsets capable of handling a variety of standards has been recognized.

A related art FFT-dedicated processor has a plurality of operation circuits corresponding to a plurality of radices in circuits for processing FFT operations, in which an operation circuit corresponding to a radix in each FFT operation stage is selected and used. Accordingly, since the FFT dedicated processor has many operation circuits corresponding to radices, circuits are large and the processor consumes a lot of power.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a fast Fourier transform (FFT) operation circuit capable of handling a plurality of FFT lengths without having a plurality of operation circuits corresponding to radices, thereby reducing the number of circuits and power consumption compared to related art technology.

According to an aspect of the present invention, there is provided a fast Fourier transform (FFT) circuit formed with a plurality of butterfly operation units connected in series, wherein each butterfly operation circuit includes: a signal sequence conversion unit reading signals in the order in which the butterfly operation circuit performs complex multiplication and complex addition and subtraction; a complex multiplication unit complex-multiplying each signal read by the signal sequence conversion unit, by a complex coefficient corresponding to an FFT length and a stage number of the butterfly operation unit; and a complex addition and subtraction unit performing complex addition and subtraction for the signal multiplied by the complex coefficient output from the complex multiplication unit.

An FFT operation circuit according to the present invention has a structure in which a plurality of butterfly operation units are connected in series. Accordingly, outputs from butterfly operation units corresponding to the number of times butterfly operations are performed according to an FFT length are selected, thereby performing operations corresponding to a variety of FFT lengths.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. In the explanation of the present invention, if it is determined that an explanation on related known structures or functions may unnecessarily make the scope of the present invention unclear, the detailed explanation will be omitted.

Figure 1:
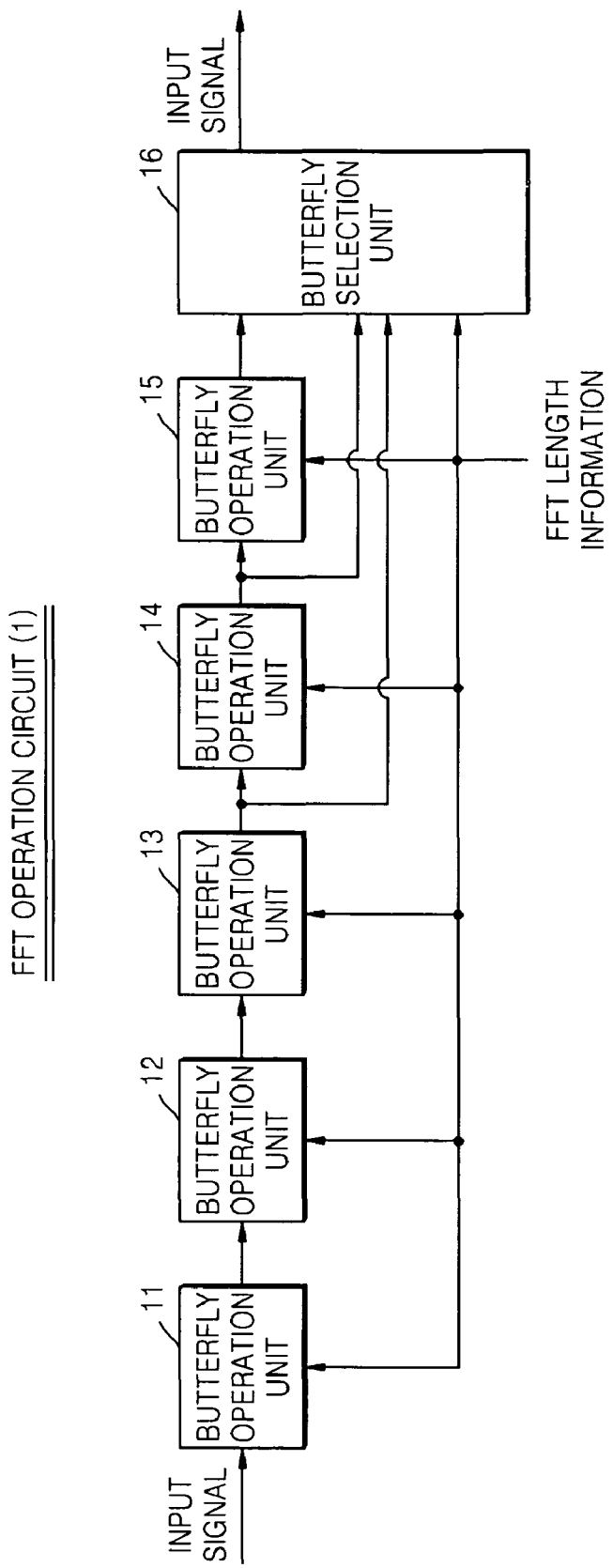
FIG. 1 is a block diagram illustrating a fast Fourier transform (FFT) operation circuit according to an exemplary embodiment of the present invention.

FIG. 1 is a block diagram illustrating a fast Fourier transform (FFT) operation circuit 1 according to an exemplary embodiment of the present invention. In the current exemplary embodiment, a butterfly operation using radix 4 will be explained, but circuits with radices of 2 to the power of n, that is, 2, 4, 8, 16, through to $2^n$ can also be implemented.

The number of butterfly operation units that are to be used varies with respect to the number of samples (channels) input from an external source that are the object of the operations. The FFT operation circuit 1 is designed so that FFT operations can be performed for each of FFT lengths 64, 256, and 1024.

In the FFT operation circuit 1 according to the current exemplary embodiment, butterfly operation units 11 through 15 are connected in series so that the output terminal of each butterfly operation unit is connected to the input terminal of the butterfly operation unit in the next stage. Also, since the FFT operation circuit 1 according to the current exemplary embodiment has a structure corresponding to the FFT lengths of 64, 256, and 1024, the FFT operation circuit 1 is used so that a predetermined number of outputs of the butterfly operation units 13, 14, and 15 are selected according to an FFT length operation unit, and the results of the selecting operation are output as the results of the FFT operation.

The FFT operation circuit 1 according to the current exemplary embodiment is designed so as to correspond to the FFT lengths of 64, 256, and 1024, and the outputs of a predetermined number of butterfly operation units 13, 14, and 15 are selected by the FFT length operation unit, and the results of the selecting operation are output as the results of the FFT operation.

According to the current exemplary embodiment, when the FFT length is 64 ($4^3$), it is 4 to the power of 3, and therefore the operation result of the FFT is output from the third stage butterfly operation unit 13. If the FFT length is 256 ($4^4$), it is 4 to the power of 4, and therefore the operation result of the FFT is output from the fourth stage butterfly operation unit 14. If the FFT length is 1024 ($4^5$), it is 4 to the power of 5, and therefore the operation result of the FFT is output from the fifth stage butterfly operation unit 15. If the FFT length is 256, the butterfly operation results is output as intermediate data from the butterfly operation unit 13 to the butterfly operation unit 14. That is, from the butterfly operation units before the last butterfly operation unit of the butterfly operation units required for the FFT length, intermediate data which corresponds to the FFT length being calculated is output.

The operation of each of the butterfly operation units 11 through 15 is set so that the butterfly operation unit changes complex coefficient data (hereinafter, referred to as coefficient data or coefficients) to be complex-multiplied by each signal (input signal) input from an external source or a previous stage according to an FFT length operator which indicates the FFT length which is input from an external source, which will be described later in detail, and butterfly operations corresponding to the intermediate data are performed at stages previous to the last stage of the stages required for butterfly operations corresponding to the FFT length so that final operation results can be output from the butterfly operation units of the last stage of the stages required for the butterfly operations corresponding to the FFT length. Here, the signals include an input signal input to the first stage butterfly operation unit 11 and intermediate data from a stage which is input to the next stage butterfly operation units 12 through 15.

For example, when the FFT length is 256, the butterfly operation units 11 through 13 perform operations generating intermediate data, the butterfly operation unit 14 outputs a final FFT operation result (output signal) from the intermediate data output from the butterfly operation unit 13. A butterfly selection unit 16 receives output signals from each butterfly operation unit and selects outputs from butterfly operation units of stages in which FFT operation results are output, according to the FFT length and the stage of each butterfly operation unit (the physical position of each butterfly operation unit), thereby outputting the selected signals as output signals.

Figure 2:
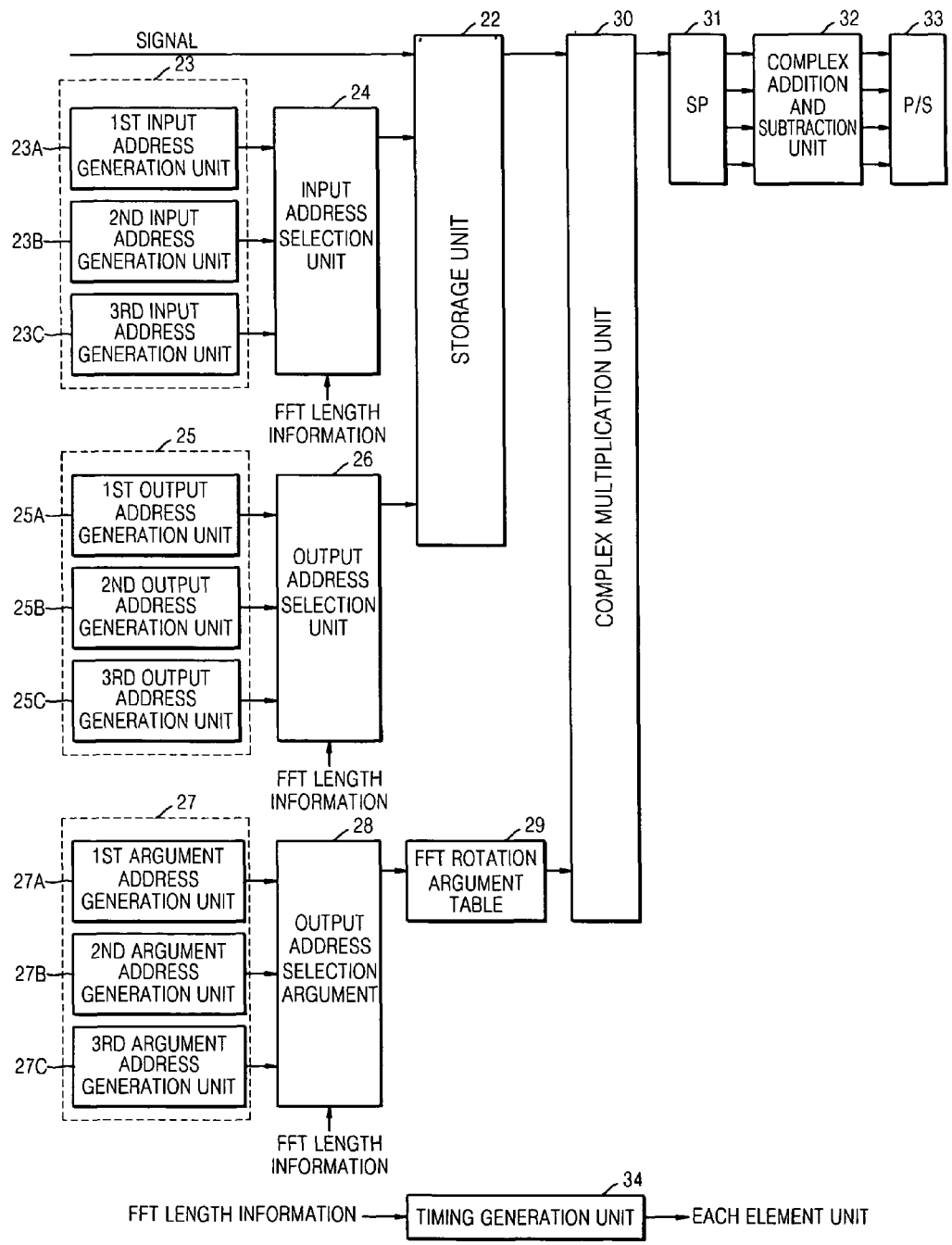
FIG. 2 is a schematic block diagram of a butterfly operation unit illustrated in FIG. 1 according to an exemplary embodiment of the present invention.
Figure 3:
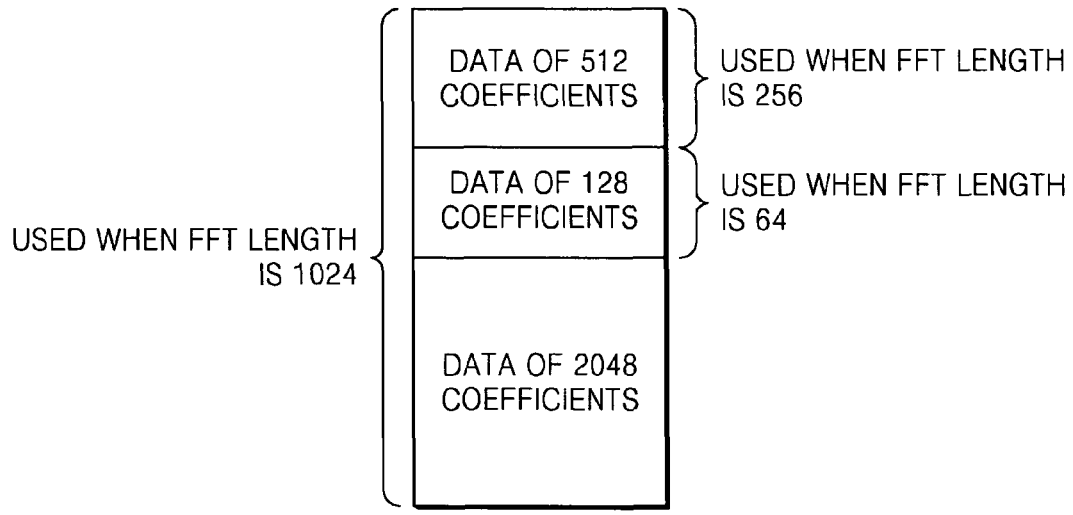
FIG. 3 is a conceptual diagram explaining the storage space of a storage unit illustrated in FIG. 2 according to an exemplary embodiment of the present invention.

The butterfly operation unit 11 illustrated in FIG. 1 will now be explained with reference to FIG. 2. FIG. 2 is a schematic block diagram of a butterfly operation unit forming the FFT operation circuit 1 illustrated in FIG. 1 according to an exemplary embodiment of the present invention. The structure of each of the other butterfly operation units 12 through 15 is designed to perform the same butterfly operation as that of the butterfly operation unit 11. The difference between each butterfly operation unit is that when the operation in which intermediate data to be output to the next stage is performed, the butterfly operation unit has a different coefficient to be complex-multiplied by input data, and the arrangement of signals for addition and subtraction of the result of complex-multiplication (sample or intermediate data) is different. Also, the butterfly operation unit 14 is designed to perform butterfly operations only when the FFT length is 256 or 1024, and thus does not perform the butterfly operation for the FFT length of 64. Furthermore, the butterfly operation unit 15 is designed to perform butterfly operations only when the FFT length is 1024, and thus does not perform the butterfly operations for the FFT length of 64 or 256.

In a storage unit 22, an input signal x(k) (signal string of x(0), x(1), x(2), through to x(k−1), x(k)), which is input sequentially from an external source, is sequentially written at a corresponding address (for example, a continuous address in the case of the first stage butterfly operation unit 11) according to an input address (to be explained below) output from an input address selection unit 24, thereby being input using the same address as the output address of a stage to the next stage of the stage.

An input address generation unit 23 generates addresses with which signals are sequentially written in the storage unit 23. The input address generation unit 23 includes a first input address generation unit 23A generating input addresses corresponding to the FFT length of 64, a second input address generation unit 23B generating input addresses corresponding to the FFT length of 256, and a third input address generation unit 23C generating input addresses corresponding to the FFT length of 1024.

An input address selection unit 24 selects an input address corresponding to the FFT length from among the input addresses provided by the input address generation unit 23 according to the FFT length operator being input, and outputs the selected input address to the storage unit 22.

The storage unit 22 can perform simultaneous reading and writing. For example, the storage unit 22 may be formed with a dual port RAM, in which storage areas are divided into two areas. By means of a double buffer structure, a memory area for writing an input signal x(k) (i.e., a signal being input) can be divided into a first memory area and a second memory area. Accordingly, according to the current exemplary embodiment, the storage unit 22 has a capacity corresponding to 2048 signals, because the storage unit 22 is designed in order to correspond to the FFT length of 1024.

The storage unit 22 may have, for example, a memory space in which the number of addresses is 2048. In a memory map for this memory space, if the FFT length is 64, the number of addresses of an address space to be used is 64, and the number of addresses used as an address space in which writing and reading are alternately performed becomes 128. The storage unit 22 forms two address spaces for the FFT length of 64, including an address space (a first memory area) in which the highest bit indicating 128 is '0' and an address space (a second memory area) in which the highest bit is '1'.

In a memory map for this memory space of the storage unit 22, if the FFT length is 256, the number of addresses of an address space to be used is 256, and the number of addresses as an address space in which writing and reading are alternately performed becomes 512. The storage unit 22 forms two address spaces for the FFT length of 256, including an address space (a first memory area) in which the highest bit indicating 512 is '0' and an address space (a second memory area) in which the highest bit is '1'.

In a memory map for this memory space of the storage unit 22, if the FFT length is 1024, the number of addresses of an address space to be used is 1024, and the number of addresses used as an address space in which writing and reading are alternately performed becomes 2048. The storage unit 22 forms two address spaces for the FFT length of 1024, including an address space (a first memory area) in which the highest bit indicating 2048 is '0' and an address space (a second memory area) in which the highest bit is '1'.

The input address generation unit 23 is formed in such a manner that each input address generation unit corresponding to an FFT length can generate an input address corresponding to the address space of the storage unit 22.

An output address generation unit 25 generates an output address so that a complex multiplication unit 30 can sequentially read a signal from the storage unit 22. The output address generation unit 25 includes a first output address generation unit 25A generating an output address corresponding to the FFT length of 64, a second output address generation unit 25B generating an output address corresponding to the FFT length of 256, and a third output address generation unit 25C generating an output address corresponding to the FFT length of 1024.

Since output addresses vary according to the FFT length and the stage of each butterfly operation unit, the output address generation unit 25 generates an output address corresponding to each stage.

The first output address generation unit 25A is for the FFT length of 64, and sequentially generates an output address so that signal data can be read from the storage unit 22 in the order in which complex addition and subtraction is performed in a complex addition and subtraction unit 32, which will be explained later. The input address generation unit 23, the output address generation unit 25 and the storage unit 22 form a signal sequence conversion unit that determines an output address so that signals (since the radix is 4, the number of arranged signals or intermediate data items is 4), which will be used for addition and subtraction operations in the complex addition and subtraction unit 32, can be continuously output from the complex multiplication unit 30. The second output address generation unit 25B and the third output address generation unit 25C are for the FFT lengths of 256 and 1024 respectively, and each of the second and third output address generation units 25B and 25C sequentially generates an output address so that signal data can be read from the storage unit 22 in the order in which complex addition and subtraction are performed in the complex addition and subtraction unit 32.

For example, if the radix is 4 and the FFT length is 256, the butterfly operation of radix 4 according to the current exemplary embodiment (the following equations are different according to an algorithm of FFT operation) is performed by receiving an input of the signal x(k), wherein $0 \leq k \leq 255$.

A discrete Fourier transform (DFT) is expressed as equation 1 below:

$$X(n) = \Sigma X(k) W_N^{nk} \quad (1)$$

In this equation, 1/N is omitted.

In equation 1, signal number n and index k indicating a frequency are given by equation 2 below:

$$n = 64n_3 + 16n_2 + 4n_1 + n_0; \ (n_0, n_1, n_2, n_3 = 0, 1, 2, 3)$$
$$k = 64k_3 + 16k_2 + 4k_1 + k_0; \ (k_0, k_1, k_2, k_3 = 0, 1, 2, 3) \quad (2)$$

The DFT is expressed as equation 3 below:

$$X(n_3, n_2, n_1, n_0) = \Sigma\Sigma\Sigma\Sigma x(k_3, k_2, k_1, k_0) W_N^{n(64k_3 + 16k_2 + 4k_1 + k_0)} \quad (3)$$

In relation to each of the values $k_3$, $k_2$, $k_1$, and $k_0$, the sum with respect to $k_3$ is requested in the first stage butterfly operation unit 11, the sum with respect to $k_2$ is requested in the second stage butterfly operation unit 12, the sum with respect to k1 is requested in the third stage butterfly operation unit 13, and the sum with respect to $k_0$ is requested in the fourth stage butterfly operation unit 14.

$$x_1(n_0, k_2, k_1, k_0) = \Sigma x(k_3, k_2, k_1, k_0) W_4^{n_0 k_3} \quad (4)$$

$$x_2(n_0, n_1, k_1, k_0) = \Sigma x_1(n_0, k_2, k_1, k_0) W_N^{16 n_0 k_2} W_4^{n_1 k_2} \quad (5)$$

$$x_2(n_0, n_1, k_1, k_0) = \Sigma x_2(n_0, n_1, k_1, k_0) W_N^{4(4n_1 + n_0)} k_1 W_4^{n_2 k_1} \quad (6)$$

$$x_4(n_0, n_1, n_2, n_3) = \Sigma x_3(n_0, n_1, n_2, k_0) W_{N(}^{16n_2 + 4n_1 + n_0)} k_0 W_4^{n_3 k_0} \quad (7)$$

Here, $x_4(n_0, n_1, n_2, n_3)$ is $X(n_3, n_2, n_1, n_0)$. Equation 4 is the output of the first stage butterfly operation unit 11, equation 5 is the output of the second stage butterfly operation unit 12, equation 6 is the output of the third stage butterfly operation unit 13, and equation 7 is the output of the fourth stage butterfly operation unit 14, that is, the DFT when the FFT length is 256. Also, $x_1$, $x_2$, and $x_3$ are intermediate data input to respective butterfly operation units in the DFT operation.

In this case, since a determination whether to perform addition or subtraction in the complex addition and subtraction unit 32 is set in relation to the complex multiplication of the coefficient '$W_4^{n_0 k_3}$' of a signal being input, that is, in relation to the complex multiplication of '+1', '−1', '+j' or '−j', in equation 4, the butterfly operation unit 11 does not perform complex multiplication. In relation to the complex addition and subtraction unit 32, 4 subtraction or addition operations corresponding to four cases where $n_0$ in $W_4^{n_0 k_3}$ is 0, 1, 2, or 3, are performed, thereby outputting 4 intermediate data items.

Since whether to perform addition or subtraction in the complex addition and subtraction unit 32 is set in relation to the complex multiplication of the coefficient '$W4^{n_2 k_1}$' of a signal being input (intermediate data), that is, in relation to the complex multiplication of '+1', '−1', '+j' or '−j', in equation 6, the butterfly operation unit 13 does not perform complex multiplication. In relation to the complex addition and subtraction unit 32, 4 subtraction or addition operations corresponding to four cases where $n_0$ in $W_4^{n_2 k_1}$ is 0, 1, 2, or 3, are performed, thereby outputting 4 intermediate data items.

Since a determination whether to perform addition or subtraction in the complex addition and subtraction unit 32 is set in relation to the complex multiplication of the coefficient '$W4^{n_3 k_0}$' of a signal being input (intermediate data), that is, in relation to the complex multiplication of '+1', '−1', '+j' or '−j', in equation 7, the butterfly operation unit 13 does not perform complex multiplication. In relation to the complex addition and subtraction unit 32, 4 subtraction or addition operations corresponding to four cases where $n_0$ in $W4^{n_3 k_0}$ is 0, 1, 2, or 3, are performed, thereby outputting 4 intermediate data items.

In relation to the butterfly operation unit 11, the signal x(k) is sequentially input from k=0 to k=255, thereby sequentially writing the signal in contiguous addresses in the storage unit 22. Accordingly, in order to read data from the storage unit 22, output addresses as described below are required. Since the sum with respect to k3 is requested in equation 4, x(k3,0,0,0) becomes the first group as a group of signals x (k3,k2,k1,k0) in relation to the complex addition and subtraction unit 32, predetermined complex additions and subtractions are performed with 4 signals as a group, including x(0), x(64), x(128), and x(192) in which $k_3$ is changed to 0, 1, 2, and 3, respectively.

Next, in regard to $x(k_3,0,0,1)$, although x(k) is obtained by changing $k_3$ to 0, 1, 2, and 3, it is necessary to sequentially read x(k) as a signal string of 4 signal groups. Accordingly, the second output address generation unit 25B in the butterfly operation unit 11 takes, as a reference, 64, which is the highest place value of a quaternary number in equation 2 expressing the number of k in the order in which a signal string is read from the storage unit 22, that is, the place value of number k3 as a reference, and fixes other storage place values. Then, the digit corresponding to the place value taken as the reference is changed to 0, 1, 2, and 3, thereby sequentially generating an output address.

The butterfly operation units 12, 13 and 14 operate as follows.

In a similar manner, since the sum with respect to k2 is requested in equation 5, $x_1(0, k_2,0,0)$ becomes the first group as a group of signals $x_1(n_0,k_2,k_1,k_0)$ in relation to the complex addition and subtraction unit 32 (butterfly operation unit 12). Predetermined complex additions and subtractions are performed with 4 signals as a group, including $x_1(0)$, $x_1(16)$, $x_1(32)$, and $x_1(48)$ in which $k_2$ is changed with 0, 1, 2, and 3, respectively.

With respect to $x_1(k_3,0,0,1)$, x(k), which is obtained by changing $k_2$ to 0, 1, 2, and 3, needs to be sequentially read as a signal string of 4 signal groups. Accordingly, the second output address generation unit 25B in the butterfly operation unit 11 takes, as a reference, 16, which is the second highest place value of a quaternary number in equation 2 expressing the number of k in the order in which a signal string is read from the storage unit 22, that is, the place value of number $k_2$, the sum with which is taken in this butterfly operation unit 12, and fixes other place values. Then, the digit corresponding to the place value taken as the reference is changed to 0, 1, 2, and 3, thereby sequentially generating an output address.

Since the sum with respect to $k_1$ is requested in equation 6, $x_2(0,0,k_1,0)$ becomes the first group as a group of signals $x_2(n_0,n_1,k_1,k_0)$ in the complex addition and subtraction unit 32 (butterfly operation unit 13). Predetermined complex additions and subtractions are performed with 4 signals as a group, including $x_2(0)$, $x_2(4)$, $x_2(8)$, and $x_2(12)$ in which $k_1$ is changed with 0, 1, 2, and 3, respectively. Accordingly, the second output address generation unit 25B in the butterfly operation unit 13 takes, as a reference, 4, which is the third highest place value of the quaternary number in equation 2 expressing the number of k in the order in which a signal string is read from the storage unit 22, that is, the place value of number $k_1$, the sum with which is taken in this butterfly operation unit 13, and fixes other place values. Then, the digit corresponding to the place value taken as the reference is changed to 0, 1, 2, and 3, thereby sequentially generating an output address.

Likewise, since the sum with respect to $k_0$ is requested in equation 7, $x_3(0,0,0,k_0)$ becomes the first group as a group of signals $x_3(n_0,n_1,n_2,k_0)$ in relation to the complex addition and subtraction unit 32 (butterfly operation unit 14). Predetermined complex additions and subtractions are performed with 4 signals as a group, including $x_13(0)$, $x_3(1)$, $x_3(2)$, and $x_3(3)$ in which $k_0$ is changed with 0, 1, 2, and 3, respectively. Next, in regard to $x_3(0,0,1,k_0)$, x(k), which is obtained by changing $k_0$ to 0, 1, 2, and 3, needs to be sequentially read as a signal string of 4 signal groups. Accordingly, the second output address generation unit 25B in the butterfly operation unit 14 takes, as a reference, 1, which is the lowest place value of the quaternary number in equation 2 expressing the number of k in the order in which a signal string is read from the storage unit 22, that is, the place value of number $k_0$, the sum with which is taken in this butterfly operation unit 14, and fixes other place values. Then, the digit corresponding to the place value taken as the reference is changed to 0, 1, 2, and 3, thereby sequentially generating an output address.

That is, the address generation unit corresponding to each FFT length of the output address generation unit 25 takes as a reference, the place value which is requested by a sum in each butterfly operation unit, and other place values other than the reference place value are sequentially changed. Then, in relation to each of these changed place values, the digit of the reference place value is changed to n-base numbers (corresponding to the radix) (for example, in the case of a quaternary number, by changing to 0, 1, 2, and 3), thereby generating an output address in relation to the signal string of a number corresponding to the radix used in the complex addition and subtraction unit 32.

Each address generation unit of the output address generation unit 25 makes changes in the place values other than the reference place value. For example, although the place values vary with respect to an algorithm of an operation, a change is made in the place values from the lowest place value.

As described above, the first output address generation unit 25A in the output address generation unit 25 of each butterfly operation unit corresponds to the FFT length of 64. Equation 2 gives the following equations:

$$n=16n_2+4n_1+n_0; (n_0, n_1, n_2=0, 1, 2, 3)$$

$$k=16k_2+4k_1+k_0; (k_0, k_1, k_2=0, 1, 2, 3)$$

Likewise, the third output address generation unit 25C in the output address generation unit 25 of each butterfly operation unit corresponds to the FFT length of 1024. Equation 2 gives the following equations:

$$n=256n_4+64n_3+16n_2+4n_1+n_0; (n_0, n_1, n_2, n_3, n_4=0, 1, 2, 3)$$

$$k=256n_4+64k_3+16k_2+4k_1+k_0; (k_0, k_1, k_2, k_3, k_4=0, 1, 2, 3)$$

As described above, in equation 2, each of the second output address generation unit 25B and the third output address generation unit 25C according to the FFT length (that is, the FFT length operator) sequentially generates an output address according to an operation equation of a read address which is determined by the radix and the FFT length, so that, if the FFT length is different, the arrangement of the signal data being read can also change (from the sequence in which signals are input and stored in the storage unit 22 to a sequence in which signals are read from the storage unit 22 by the complex multiplication unit 30).

Also, in relation to each butterfly operation unit, by taking the place value in relation to which the sum in equation 2 is obtained, as a lowest place value, a counter counting the place values in increasing order from the lowest place value of the place values of equation 2 is formed and each output address generation unit 25 can be formed.

Also, each of the output address generation units is formed such that the output address generation accesses sequentially the addresses of a read only memory (ROM) which corresponds to the FFT length and in which output addresses with which signal data is read are sequentially stored, and reads the stored output addresses, thereby generating the output addresses.

According to an FFT length being input, the output address selection unit 26 selects an output address corresponding to the FFT length, and outputs it as an output address, to the storage unit 22.

In relation to data x(k) of a signal input sequentially from the storage unit 22, the complex multiplication unit 30 sequentially complex-multiplies coefficients read from an FFT rotation argument table 29, for example, in the case of the FFT length of 256, the complex multiplication unit 30 sequentially multiplies 1 in relation to the butterfly operation unit 11, $W_N 1^{6n0k2}$ in relation to the butterfly operation unit 12, $WN_4^{(4n1+n0)k1}$ in relation to the butterfly operation unit 13, and $W_N^{(16n2+4n1+n0)k0}$ in relation to the butterfly operation unit 14, and outputs the complex multiplication results.

Figure 4:
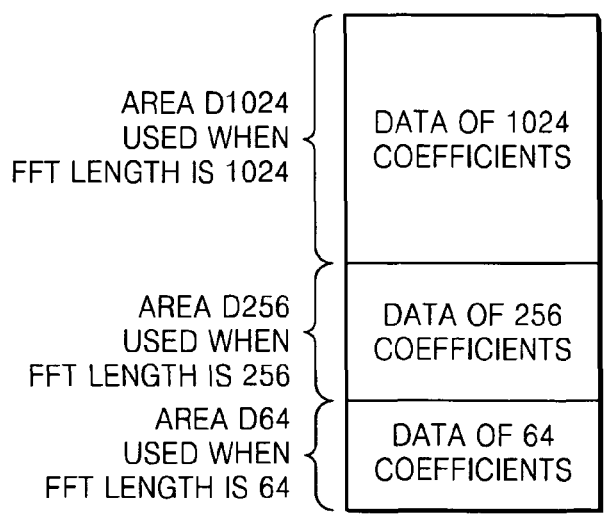
FIG. 4 is a conceptual diagram explaining a structure of an FFT rotation argument table illustrated in FIG. 2 according to an exemplary embodiment of the present invention.

In order to make each of the coefficients, as is the case with the complex coefficients (or complex rotation arguments), different for each signal which is the object of complex multiplication (that is, corresponding to the FFT length and the stage of the butterfly operation unit), a table corresponding to the FFT lengths and each stage of the butterfly operation unit is stored in the FFT rotation argument table unit 29 as illustrated in FIG. 4. This table may be stored in a ROM in advance, or may be read from outside before an operation begins in a RAM.

As illustrated in FIG. 4, the FFT rotation argument table 29 is formed with storage areas for coefficients corresponding to each FFT length, and thus includes an area D64 storing coefficients used when the FFT length is 64, an area D256 storing coefficients used when the FFT length is 256, and an area D1024 storing coefficients used when the FFT length is 1024.

An argument address generation unit 27 is composed of a first argument address generation unit 27A generating an argument address for sequentially reading coefficients stored in the area D64, a second argument address generation unit 27B generating an argument address for sequentially reading coefficients stored in the area D256, and a third argument address generation unit 27C generating an argument address for sequentially reading coefficients stored in the area D1024.

The argument address generation unit 27 sequentially generates argument addresses for reading coefficients from the FFT rotation argument table 29 in order to read coefficients for complex multiplication keeping pace with the signal data sequentially read from the storage unit 22 according to the FFT length.

The argument address selection unit 28 selects any one of argument addresses that the first argument address generation unit 27A, the second argument address generation unit 27B, and the third argument address generation unit 27C generate and output according to the input FFT length operator, and outputs the selected argument to the FFT rotation argument table 29.

The complex multiplication unit 30 multiplies each data item of signals input sequentially from the storage unit 22, by each coefficient read from the FFT rotation argument table 29, and outputs the results to a serial/parallel conversion unit 31. The serial/parallel conversion unit 31 serially receives inputs of 4 signal data groups to which coefficients are multiplied, in the order in which data is read from the storage unit 22 according to the address output from the output address generation unit 25 (for example, in the order of {x(0), x(64), x(128), x(192)}, {x(1), x(65), x(129), x(193),} etc.}. Then, the serial/parallel conversion unit 31 first stores the data of these group signals, and parallel outputs the data to the complex addition and subtraction unit 32.

Also, the complex addition and subtraction unit 32 in each butterfly operation unit outputs to a parallel/serial conversion unit 33, the result of performing the addition and subtraction operations of equations 4 through 7 corresponding to the butterfly operation unit. For example, the complex addition and subtraction unit 32 in the butterfly operation unit 11 performs predetermined complex additions and subtractions with respect to an input signal group {x(0), x(64), x(128), x(192)}, and outputs intermediate data {$x_1(0)$, $x_1(64)$, $x_1(128)$, $x_1(192)$}, as the operation result, to the parallel/serial conversion unit 33.

The parallel/serial conversion unit 33 converts the string of the operation result {$x_1(0)$, $x_1(64)$, $x_1(128)$, $x_1(192)$} that are input in parallel, into a serial string, and outputs the result in order of $x_1(0)$, $x_1(64)$, $x_1(128)$, and $x_1(192)$.

A timing generation unit 34 outputs to a corresponding module, operation clocks for controlling the timing at which signal data is recorded in the storage unit 22, the timing at which the input address generation unit 23 generates and outputs an input address, the timing at which the output address generation unit 25 generates and outputs an output address, the timing at which the input address selection unit 24, the output address selection unit 26 and the argument address selection unit 28 perform respective selection processing, the timing at which the complex multiplication unit 30 performs complex multiplication, the timing at which the serial/parallel conversion unit 31 performs serial to parallel conversion, the timing at which the complex addition and subtraction unit 32 performs complex addition and subtraction, and the timing at which the parallel/serial conversion unit 33 performs parallel to serial conversion of the output of the complex addition and subtraction unit 32. In this way, the operation of the module is controlled according to the FFT length indicated by the FFT length operator.

That is, in the case of the FFT length of 64, whenever 64 data items are input, in the case of the FFT length of 256, whenever 256 data items are input, and in the case of the FFT length of 1024, whenever 1024 data items are input, FFT operations which will be explained below are periodically performed.

In the first and second storage areas in the double buffer of the storage unit 22, the input address selection unit 24 and the output address selection unit 26 can alternately use the area for writing data and the area for reading data in each of the periods.

The operation of the FFT operation circuit 1 according to the exemplary embodiments of the present invention will now be explained with reference to FIGS. 1 and 2. Here, a case where the input FFT length is 256 will be explained. A signal string of input signal x(k), wherein $0 \leq k \leq 255$, that is, {x(0), x(1), x(2), x(3), through to x(254), x(255)}, is input into the FFT operation circuit 1. Also, an FFT length operator indicating that the FFT length is 256 is input into the FFT operation circuit 1.

The signal string is serially input to the butterfly operation unit 11. Since the FFT length operator indicating that the FFT length is 256 is input to the input address selection unit 24 in the butterfly operation unit 11, the input address selection unit 24 outputs the input address input from the second input address generation unit 23B, to the storage unit 22.

Then, in the storage unit 22, the serially input signal string {x(0), x(1), x(2), x(3), through to x(254), x(255)} is recorded at an address obtained by adding '0' as the highest bit to the input address.

Here, if generation and output of the input addresses for the signal string from x(0) to x(255) are finished, the second input address generation unit 23B begins output of an input address for a signal string from x(0) to x(255) in the next FFT operation cycle.

In this way, in the storage unit 22, the serially input signal string {x(0), x(1), x(2), x(3), through to x(254), x(255)} is recorded at an address obtained by adding '1' as the highest bit to the input address (the second memory area).

Also, in order for the FFT length operator, which indicates that the FFT length is 256, to be input to the output address selection unit 26, the output address selection unit 26 sequentially outputs output addresses input from the second output address generation unit 25B, to the storage unit 22.

The output address selection unit 26 is formed in such a manner that the output address selection unit 26 alternately changes the highest bit of an output address between '0' and '1' whenever output addresses corresponding to 256 signals are output according to the FFT length. Here, an address obtained by adding '0' as the highest bit to the output address output from the second output address generation unit 28B is sequentially output to the storage unit 22.

When the operation of equation 4 is performed in the complex addition and subtraction unit 32 in the order of signals corresponding to processing performed as addition and subtraction operations, the second output address generation unit 28B outputs output addresses according to that order. Accordingly, signals {x(0), x(64), x(128), x(192), x(1), x(65), x(129), x(193), through to x(63), x(127), x(191), x(255)} are sequentially read from the storage unit 22 and input to the complex multiplication unit 26.

The argument address selection unit 28 sequentially outputs argument addresses input from the second argument address generation unit 27B to the FFT rotation argument table 29 so that the FFT length operator, which indicates that the FFT length is 256, can be input in the argument address selection unit 28.

In this way, according to the address output from the second argument address generation unit 27B, the FFT rotation argument table 29 sequentially outputs 256 coefficients to be multiplied to each of signals {x(0), x(64), x(128), x(192), x(1), x(65), x(129), x(193), through to x(63), x(127), x(191), x(255)}.

As can be determined from equation 4, in the current exemplary embodiment, the coefficient complex-multiplied to each signal in the butterfly operation unit 11 is only integer '1' (the integer part of a complex number). However, according to the operation algorithm, a coefficient corresponding to the algorithm is read from the FFT rotation argument table 29 and used in the complex multiplication unit 30 so that the corresponding coefficient can be complex-multiplied.

Accordingly, the complex multiplication unit 30 complex-multiplies each of {x(0), x(64), x(128), x(192), through to x(63), x(127), x(191), x(255)} by coefficient '1', and sequentially outputs the result {x(0), x(64), x(128), x(192), through to x(63), x(127), x(191), x(255)} to the serial/parallel conversion unit 31.

By using the output operation results, the serial/parallel conversion unit 31 rearranges a group of 4 coefficients or complex-multiplied signals being parallel input, for example, the serial/parallel conversion unit 31 rearranges serially input {x(0), x(64), x(128), x(192)} so as to be in a parallel format, and outputs the result to the complex addition and subtraction unit 32.

In this way, the complex addition and subtraction unit 32 performs additions and subtraction corresponding to the coefficient '$W_4^{n0k3}$' in equation 4 by using each data item of {x(0), x(64), x(128), x(192)}, and parallel outputs the operation result {$x_1(0)$, $x_1(64)$, $x_1(128)$, $x_1(192)$}. Then, the parallel/serial conversion unit 33 converts the complex addition and subtraction result {$x_1(0)$, $x_1(64)$, $x_1(128)$, $x_1(192)$} into serial signals in the order of $x_1(0)$->$x_1(64)$->$x_1(128)$->$x_1(192)$, and serially outputs the signals.

The parallel-to-serial converted serial output from this butterfly operation unit 11 becomes an input signal of the next stage butterfly operation unit 12, thereby becoming intermediate data of the first stage in the FFT operation with respect to the 256 signals. By performing the butterfly operation described above in the butterfly operation unit 11, when signal data is read from any one area of the first and second memory areas of the double buffer of the storage unit 22 and the butterfly operation of the read signal data is performed, a new signal string is written in the other area.

Next, the butterfly operation unit 12 receives an input of the intermediate data string {$x_1(0)$, $x_1(1)$, $x_1(2)$, $x_1(3)$, through to $x_1(253)$, $x_1(254)$, $x_1(255)$} that is input from the butterfly operation unit 11, that is, the intermediate data $x_1(k)$, as input data. Here, the second input address generation unit 23B outputs the same input addresses as the output addresses of the previous stage. The input intermediate data is written in the storage unit 22 according to the input addresses. Then, the butterfly operation unit 12 performs the same butterfly operations as those of the butterfly operation unit 11. In relation to this intermediate data $x_1(n_0, k_2, k_1, k_0)$, the number k of the intermediate data is determined as $k=64n_0+16k_2+4k_1+k_0$; ($k_0, k_1, k_2, n_0=0, 1, 2, 3$).

That is, since the FFT length operator, which indicates that the FFT length is 256, is also input to the input address selection unit 24 in the butterfly operation unit 12, as in the butterfly operation unit 11, the input address selection unit 24 outputs the input address input from the second input address generation unit 23B to the storage unit 22.

In this way, in the storage unit 22, according to the input address, the intermediate data input from the butterfly operation unit 11 is sequentially written to the input address having the same value as the output address of the previous stage (as in the butterfly operation unit 11, the storage unit 22 has a double buffer structure which is divided into a first memory area and a second memory area, and therefore writing and reading of data are performed in the same manner).

Since the FFT length operator, which indicates that the FFT length is 256, is input to the output address selection unit 26 in the butterfly operation unit 12, the output address selection unit 26 outputs the input address input from the second output address generation unit 25B to the storage unit 22. Likewise, since the FFT length operator, which indicates that the FFT length is 256, is input to the argument address selection unit 28, the argument address selection unit 28 outputs the argument address input from the second argument address generation unit 27B to the FFT rotation argument table 29.

In order to perform the operation (a sum with respect to a number $k_2$ with a place value of about 16) of equation 5 by the complex addition and subtraction unit 32, the second output address generation unit 25B fixes $n_0$, $k_1$, and $k_0$ other than $k_2$ and, by using $x_1(0,k_2,0,0)$, changes $k_2$ to 0, 1, 2, and 3, thereby generating addresses to read intermediate data $x_1(0)$, $x_1(16)$, $x_1(32)$, and $x_1(48)$. Then, by using $x_1(0,k_2,0,1)$, the second output address generation unit 25B changes $k_2$ to 0, 1, 2, and 3, thereby sequentially generating output addresses as $x_1(1)$, $x_1(17)$, $x_1(33)$, and $x_1(49)$. In this way, the intermediate data recorded in the storage unit 22 is read according to the output address of the second output address generation unit 25B and output to the complex multiplication unit 30.

That is, when complex additions and subtractions of the intermediate data $x_1(k)$ input from the butterfly operation unit 11 are performed in the complex addition and subtraction unit 32 according to the coefficient $W_4^{n1k2}$, the second output address generation unit 25B generates and outputs output addresses in the order in which the addresses are input and stored in the storage unit 22 (for example, the first memory area), so that the output addresses can be grouped as intermediate data.

Likewise, the FFT rotation argument table 29 outputs the rotation argument coefficient $W_N^{16n0k2}$ corresponding to an argument address output from the second argument address generation unit 27B.

Here, the FFT rotation argument table 29 of the butterfly operation unit 12 has a table corresponding to each FFT length. In this table, a coefficient that is to be complex-multiplied to each of intermediate data x1(k) output from the storage unit 22 in the second state butterfly operation unit 12 is stored in relation to each FFT length.

Next, the complex multiplication unit 30 complex-multiplies each of the intermediate data output from the storage unit 22 by a coefficient output from the FFT rotation argument table 29, and outputs the result of the complex-multiplication to the serial/parallel conversion unit 31. Then, the processing in the serial/parallel conversion unit 31, the complex addition and subtraction unit 32, and the parallel/serial conversion unit 33 are the same as in the butterfly operation unit 11, and therefore, a detailed explanation thereof will be omitted here.

Then, the butterfly operation unit 12 outputs an intermediate data string $x_2(k)$ wherein $0 \leq k \leq 255$, as the result of the butterfly operation in the second stage.

Next, the butterfly operation unit 13 receives an input of the intermediate data string $\{x_2(0), x_2(1), x_2(2), x_2(3),$ through to $x_2(253), x_2(254), x_2(255)\}$ that is input from the butterfly operation unit 12, that is, the intermediate data $x_2(k)$, as input data. Here, the second input address generation unit 23B outputs the same input addresses as the output addresses of the previous stage. The input intermediate data is written in the storage unit 22 according to the input addresses. Then, the butterfly operation unit 13 performs the same butterfly operations as those of the butterfly operation unit 12. In relation to this intermediate data $x_2(n_0, n_1, k_1, k_0)$, the number k of the intermediate data is determined as $k=64n_0+16n_1+4k_1+k_0$; ($k_0, k_1, n_1, n_0=0, 1, 2, 3$).

That is, since the FFT length operator, which indicates that the FFT length is 256, is also input to the input address selection unit 24 in the butterfly operation unit 13 as occurs in the butterfly operation units 11 and 12, the input address selection unit 24 outputs the input address input from the second input address generation unit 23B to the storage unit 22.

In this way, in the storage unit 22, according to the input address, the intermediate data input from the butterfly operation unit 12 is sequentially written to the input address having the same value as the output address of the previous stage (as in the butterfly operation units 11 and 12, the storage unit 22 has a double buffer structure which is divided into a first memory area and a second memory area, and therefore writing and reading of data are performed in the same manner).

Since the FFT length operator, which indicates that the FFT length is 256, is input to the output address selection unit 26 in the butterfly operation unit 13, the output address selection unit 26 outputs the input address input from the second output address generation unit 25B to the storage unit 22. Likewise, since the FFT length operator, which indicates that the FFT length is 256, is input to the argument address selection unit 28, the argument address selection unit 28 outputs the argument address input from the second argument address generation unit 27B to the FFT rotation argument table 29.

In order to perform the operation (a sum with respect to a number $k_2$ with a place value of about 4) of equation 6 by the complex addition and subtraction unit 32, the second output address generation unit 25B fixes $n_0, n_1,$ and $k_0$ other than $k_1$ and, by using $x_2(0,0,k_1,0)$, changes $k_1$ to 0, 1, 2, and 3, thereby generating addresses to read intermediate data $x_2(1), x_2(5), x_2(9),$ and $x_2(13)$. Then, by using $x_3(0,0,k_1,1)$, the second output address generation unit 25B changes $k_1$ to 0, 1, 2, and 3, thereby sequentially generating output addresses as $x_2(1), x_2(5), x_2(9),$ and $x_2(13)$. In this way, the intermediate data recorded in the storage unit 22 is read according to the output address of the second output address generation unit 25B and output to the complex multiplication unit 30.

That is, when complex additions and subtractions of the intermediate data $x_2(k)$ input from the butterfly operation unit 12 are performed in the complex addition and subtraction unit 32 according to the coefficient $W_4^{n2k1}$, the second output address generation unit 25B generates and outputs output addresses in the order in which the addresses are input and stored in the storage unit 22 (for example, the first memory area), so that the output addresses can be grouped as intermediate data.

Likewise, the FFT rotation argument table 29 outputs the rotation argument coefficient $W_N^{4(4n1+n0)k1}$ corresponding to an argument address output from the second argument address generation unit 27B. Here, the FFT rotation argument table 29 of the butterfly operation unit 13 has a table corresponding to each FFT length. In this table, a coefficient that is to be complex-multiplied to each of intermediate data $x_2(k)$ output from the storage unit 22 in the third stage butterfly operation unit 13 is stored in relation to each FFT length.

Next, the complex multiplication unit 30 complex-multiplies each of the intermediate data output from the storage unit 22 by a coefficient output from the FFT rotation argument table 29, and outputs the result of the complex-multiplication to the serial/parallel conversion unit 31. Then, the processing in the serial/parallel conversion unit 31, the complex addition and subtraction unit 32, and the parallel/serial conversion unit 33 are the same as in the butterfly operation unit 11, and therefore, a detailed explanation thereof will be omitted here. Then, the butterfly operation unit 13 outputs an intermediate data string $x_3(k)$, wherein $0 \leq k \leq 255$, as the result of the butterfly operation in the second stage. As described above, the butterfly operation unit 13 also outputs the intermediate data string $x_3(k)$, wherein $0 \leq k \leq 255$, in the third stage by the same processing as that of the butterfly operation unit 12.

Next, the butterfly operation unit 14 receives an input of the intermediate data string $\{X_3(0), x_3(1), x_3(2), x_3(3),$ through to $x_3(253), x_3(254), x_3(255)\}$ that is input from the butterfly operation unit 13, that is, the intermediate data $x_3(k)$, as input data. Here, the second input address generation unit 23B outputs the same input addresses as the output addresses of the previous stage. The input intermediate data is written in the storage unit 22 according to the input addresses. Then, after the input data is input, the butterfly operation unit 14 performs the same butterfly operations as those of the butterfly operation units 12 and 13. In relation to this intermediate data $x_3(n_0, n_1, n_2, k_0)$, the number k of the intermediate data is determined as $k=64n_0+16n_1+4n_2+k_0$; ($k_0, k_1, n_1, n_0=0, 1, 2, 3$).

That is, since the FFT length operator, which indicates that the FFT length is 256, is also input to the input address selection unit 24 in the butterfly operation unit 14 as occurs in the butterfly operation units 12 and 13, the input address selection unit 24 outputs the input address input from the second input address generation unit 23B to the storage unit 22. In this way, in the storage unit 22, according to the input address, the intermediate data input from the butterfly operation unit 13 is sequentially written to the input address having the same value as the output address of the previous stage (as in the butterfly operation units 11 and 12, the storage unit 22 has a double buffer structure which is divided into a first memory area and a second memory area, and therefore writing and reading of data are performed in the same manner).

Since the FFT length operator, which indicates that the FFT length is 256, is input to the output address selection unit 26 in the butterfly operation unit 14, the output address selection unit 26 outputs the input address input from the second output address generation unit 25B to the storage unit 22.

Likewise, since the FFT length operator, which indicates that the FFT length is 256, is input to the argument address selection unit 28, the argument address selection unit 28 outputs the argument address input from the second argument address generation unit 27B to the FFT rotation argument table 29.

In order to perform the operation (a sum with respect to a number $k_2$ with a place value of about 1) of equation 7 by the complex addition and subtraction unit 32, the second output address generation unit 25B fixes $n_0$, $n^1$, and $n_2$ other than $k_0$ and, by using $x_3(0,0,0,k_0)$, changes $k_0$ to 0, 1, 2, and 3, thereby generating addresses to read intermediate data $x_3(0)$, $x_3(1)$, $x_3(2)$, and $x_3(3)$. Then, by using $x_3(0,0,1,k_0)$, the second output address generation unit 25B changes $k_0$ to 0, 1, 2, and 3, thereby sequentially generating output addresses as $x_3(4)$, $x_3(5)$, $x_3(6)$, and $x_3(7)$. In this way, the intermediate data recorded in the storage unit 22 is read according to the output address of the second output address generation unit 25B and output to the complex multiplication unit 30.

That is, when complex additions and subtractions of the intermediate data $x_3(k)$ input from the butterfly operation unit 12 are performed in the complex addition and subtraction unit 32 according to the coefficient $W_4^{n3k0}$, the second output address generation unit 25B generates and outputs output addresses in the order in which the addresses are input and stored in the storage unit 22 (for example, the first memory area), so that the output addresses can be grouped as intermediate data.

Likewise, the FFT rotation argument table 29 outputs the rotation argument coefficient $W_N^{(16n2+4n1+n0)k0}$ corresponding to an argument address output from the second argument address generation unit 27B. Here, the FFT rotation argument table 29 of the butterfly operation unit 14 has a table corresponding to each FFT length. In this table, a coefficient that is to be complex-multiplied to each of intermediate data $x_3(k)$ output from the storage unit 22 in the third stage butterfly operation unit 14 is stored in relation to each FFT length.

Next, the complex multiplication unit 30 complex-multiplies each of the intermediate data output from the storage unit 22 by a coefficient output from the FFT rotation argument table 29, and outputs the result of the complex-multiplication to the serial/parallel conversion unit 31. Then, the processing in the serial/parallel conversion unit 31, the complex addition and subtraction unit 32, and the parallel/serial conversion unit 33 are the same as in the butterfly operation unit 11, and therefore, a detailed explanation thereof will be omitted here.

Then, the butterfly operation unit 14 outputs an intermediate data string $x_4(k)$, wherein $0 \leq k \leq 255$, as the result of the butterfly operation in the fourth stage. As described above, the butterfly operation unit 13 also outputs the intermediate data string $x_4(k)$, wherein $0 \leq k \leq 255$, in the fourth stage by the same processing as that of the butterfly operation unit 12.

Since the FFT length operator indicates that the FFT length is 256, the butterfly selection unit 16 selects the intermediate data $x_4(k)$, wherein $0 \leq k \leq 255$, and outputs the FFT operation result $X(n)$, wherein $0 \leq n \leq 255$.

Accordingly, when the FFT length is 256, the butterfly operation unit 14 outputs the output signal {X(0), X(1), X(2), X(3), through to X(254), X(255)} that is the result of the FFT operation of the input signal string {x(0), x(1), x(2), x(3), through to x(254), x(255)}, thereby generating the output signal as the FFT operation result of the FFT operation circuit 1.

As described above, in each case of the FFT lengths of 64, 256, and 1024, each of the butterfly operation units 11 through 15 performs complex multiplication of a coefficient by an input signal or intermediate data, and addition and subtraction of a signal (sample or intermediate data) obtained by complex-multiplication of the coefficient. Although the reading sequence of signals (intermediate data) provided from the storage unit is different and the coefficients stored in the FFT rotation argument table 29 are different, each of the butterfly operation units 11 through 15 perform essentially identical processing.

Also, in order to perform butterfly operations on an input signal or intermediate data from the previous stage, the butterfly operation units 11 through 15 have structures that are different from each other, which will be explained later. Since the butterfly operation units 11, 12 and 13 need to perform butterfly operations with the signal and intermediate data, the butterfly operation units 11, 12 and 13 have structures corresponding to the case where the FFT length is 64, 256, and 1024. That is, the input address generation unit 23 is formed with the first input address generation unit 23A, the second input address generation unit 23B, and the third input address generation unit 23C, the output address generation unit 25 is formed with the first output address generation unit 25A, the second output address generation unit 25B, and the third output address generation unit 25C, and the argument address generation unit 27 is formed with the first argument address generation unit 27A, the second argument address generation unit 27B, and the third argument address generation unit 27C. In the FFT rotation argument table 29, coefficients for the FFT lengths of 64, 256, 1024, respectively, are stored. Also, the input address selection unit 24, the output address selection unit 26, and the argument address selection unit 28 of each butterfly operation unit 11, 12, and 13 correspond to the structure described above, and are changed according to the FFT lengths of 64, 256, and 1024.

However, since the butterfly operation unit 14 does not need to perform butterfly operations when the FFT length is 64, the butterfly operation unit 14 has a structure corresponding to the FFT lengths of 256 and 1024. Accordingly, in the butterfly operation unit 14, the input address generation unit 23 is formed with the second input address generation unit 23B and the third address generation unit 23C, the output address generation unit 25 is formed with the second output address generation unit 25B and the third output address generation unit 25C, and the argument address generation unit 27 is formed with the second argument address generation unit 27A and the third argument address generation unit 27B. In the FFT rotation argument table 29, coefficients for the FFT lengths of 256 and 1024, respectively, are stored. Also, the input address selection unit 24, the output address selection unit 26, and the argument address selection unit 28 of the butterfly operation unit 14 correspond to the structure described above, and are changed according to the FFT lengths of 256, and 1024.

Likewise, in order to perform butterfly operations only when the FFT length is 1024, the butterfly operation unit 15 has a structure corresponding to the FFT length of 1024. In the butterfly operation unit 15, the input address generation unit 23 is formed with the third input address generation unit 23C, the output address generation unit 25 is formed with the third output address generation unit 25C, and the argument address generation unit 27 is formed with the third argument address generation unit 27C. In the FFT rotation argument table 29, the coefficients of the FFT length of 1024 is stored. Also, since the butterfly operation unit 14 needs an input address, an output address, an argument address and a coefficient in order to be complex-multiplied to intermediate data only when the FFT length is 1024, the input address selection unit 24, the output address selection unit 26, and the argument address selection unit 28 are not disposed.

The butterfly operation units 14 and 15 may be formed to have the same circuits as those of the butterfly operation units 11 through 13, and then, only required parts of the butterfly operation units 14 and 15 need be used. Also, in another exemplary embodiment, if the FFT length operator indicates that the FFT length is 64, the butterfly operation units 14 and 15 can stop operations, and if the FFT length operator indicates that the FFT length is 256, the butterfly operation unit 15 can stop operations.

According to the exemplary embodiments described above, in relation to the input address generation unit 23, the output address generation unit 25 and the storage unit 22, which comprise the signal sequence conversion unit, signals are written in contiguous addresses in the storage unit 22 in the order in which the signals are input. Also, the output address generation unit 25 corresponding to the FFT length reads signals from the storage unit 22 in the order in which signals are complex-multiplied, thereby generating output addresses.

However, the input addresses that are to be written in the storage unit 22 may be generated in such a manner that signals are stored contiguously in the storage unit 22 in the order in which the signals are complex-multiplied, thereby allowing input signals corresponding to the input addresses to be sequentially written in the storage unit 22. In this way, the sequence of signal inputs can be converted into a sequence in which each operation is performed, in the same manner as described above. Accordingly, the output address generation unit 25 generates contiguous addresses of the storage unit 22 and signals are sequentially read from the storage unit 22.

Also, the FFT operation circuit of the exemplary embodiments described above can be used as an inverse FFT operation circuit, by changing the coefficients of the FFT rotation argument table 29 and addition and subtraction expressions in each butterfly operation unit.

According to the exemplary embodiments of the present invention as described above, even without a plurality of operation circuits corresponding to radices, FFT operations corresponding to a plurality of FFT lengths can be performed, thereby reducing the size of the circuit compared to those of related art FFT processors.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the exemplary embodiments of the present invention.

What is claimed is:

1. A fast Fourier transform (FFT) circuit formed with a plurality of butterfly operation units connected in series, wherein each butterfly operation unit comprises:
   a signal sequence conversion unit which stores a signal input to the butterfly operation unit and reads signals including the stored signal in an order in which the butterfly operation unit performs complex multiplication and complex addition and subtraction;
   a complex multiplication unit which complex-multiplies each signal read by the signal sequence conversion unit, by a complex coefficient which corresponds to an FFT length and a stage number of the butterfly operation unit;
   a complex addition and subtraction unit which performs complex addition and subtraction for the signal multiplied by the complex coefficient, and
   a butterfly selection unit which selects operation results of at least one of the plurality of butterfly operation units depending on the FFT length, and which outputs the selected result.

2. A fast Fourier transform (FFT) circuit formed with a plurality of butterfly operation units connected in series, wherein each butterfly operation unit comprises:
   a signal sequence conversion unit which stores a signal input to the butterfly operation unit and reads signals including the stored signal in an order in which the butterfly operation unit performs complex multiplication and complex addition and subtraction;
   a complex multiplication unit which complex-multiplies each signal read by the signal sequence conversion unit, by a complex coefficient which corresponds to an FFT length and a stage number of the butterfly operation unit; and
   a complex addition and subtraction unit which performs complex addition and subtraction for the signal multiplied by the complex coefficient,
   wherein each butterfly operation unit further comprises a complex coefficient storage unit which corresponds to the FFT length and the stage number of the butterfly operation unit, and stores complex coefficients that are to be complex-multiplied to each signal, and the complex multiplication unit sequentially reads the complex coefficients from the complex coefficient storage unit and complex-multiplies each signal read by the signal sequence conversion unit, by the complex coefficients.

3. The FFT circuit of claim 2, wherein the complex coefficient storage unit is divided into storage areas for coefficients corresponding to different FFT lengths, respectively.

4. The FFT circuit of claim 3, wherein each butterfly operation unit further comprises one or more argument address generation units which generate an argument address for reading a coefficient written in each storage area of the complex coefficient storage unit.

5. The FFT circuit of claim 4, wherein each butterfly operation unit further comprises an argument address selection unit which selects any one of argument addresses generated in the argument address generation units, and outputs the selected address to the complex coefficient storage unit.

6. A fast Fourier transform (FFT) circuit formed with a plurality of butterfly operation units connected in series, wherein each butterfly operation unit comprises:
   a signal sequence conversion unit which stores a signal input to the butterfly operation unit and reads signals including the stored signal in an order in which the butterfly operation unit performs complex multiplication and complex addition and subtraction;
   a complex multiplication unit which complex-multiplies each signal read by the signal sequence conversion unit, by a complex coefficient which corresponds to an FFT length and a stage number of the butterfly operation unit; and a complex addition and subtraction unit which performs complex addition and subtraction for the signal multiplied by the complex coefficient, wherein the signal sequence conversion unit comprises:

a storage unit which temporarily stores the signal input to the butterfly operation unit;

an input address generation unit which generates an input address for writing the signal input to the storage unit of the butterfly operation unit in an order in which the signal is input; and an output address generation unit which corresponds to the FFT length and generates an output address for sequentially reading the signal to be complex-multiplied by the complex coefficient read by the complex multiplication unit.

7. The FFT circuit of claim 6, wherein the signal temporarily stored in the storage unit is sequentially read according to the output address and transferred to the complex multiplication unit.

8. The FFT circuit of claim 6, wherein the signal sequence conversion unit comprises a plurality of input address generation units and a plurality of output address generation units which correspond to the FFT length, and an input address generation unit and an output address generation unit which correspond to the FFT length are selected from among the plurality of input address generation units and the plurality of output address generation units, and an input address and an output address are generated.

9. The FFT circuit of claim 8, wherein the signal sequence conversion unit comprises:

an input address selection unit which selects any one of output signals of the plurality of input address generation units according to the FFT length information and outputs the selected signal; and an output address selection unit which selects any one of output signals of the plurality of output address generation units according to the FFT length information and outputs the selected signal.

10. A fast Fourier transform (FFT) circuit formed with a plurality of butterfly operation units connected in series, wherein each butterfly operation unit comprises:

a signal sequence conversion unit which stores a signal input to the butterfly operation unit and reads signals including the stored signal in an order in which the butterfly operation unit performs complex multiplication and complex addition and subtraction;

a complex multiplication unit which complex-multiplies each signal read by the signal sequence conversion unit, by a complex coefficient which corresponds to an FFT length and a stage number of the butterfly operation unit; and a complex addition and subtraction unit which performs complex addition and subtraction for the signal multiplied by the complex coefficient, wherein each butterfly operation unit further comprises a timing generation unit which generates a signal to control the operation timing of each element of the FFT operation circuit according to the FFT length information.

* * * * *